United States Patent [19]

Ruggiero

[11] Patent Number: 5,057,153

[45] Date of Patent: Oct. 15, 1991

[54] PAINT CONTAINING HIGH LEVELS OF A PYRITHIONE SALT PLUS A COPPER SALT

[75] Inventor: Murray A. Ruggiero, East Haven, Conn.

[73] Assignee: Olin Corporation, Chelshire, Conn.

[21] Appl. No.: 650,127

[22] Filed: Feb. 4, 1991

Related U.S. Application Data

[63] Continuation-in-part of Ser. No. 518,602, May 3, 1990, abandoned.

[51] Int. Cl.$^5$ ................................................. C09D 5/14
[52] U.S. Cl. .................................... 106/18.33; 106/16; 106/18.34; 71/67; 514/188; 514/345; 514/499; 514/500
[58] Field of Search ..................... 106/15.05, 16, 18.34, 106/18.33; 71/67; 514/499, 500, 345, 188

[56] References Cited

U.S. PATENT DOCUMENTS

| | | | |
|---|---|---|---|
| 3,615,744 | 10/1971 | Yokoo et al. | 106/15.05 |
| 4,039,312 | 8/1977 | Patru | 106/16 |
| 4,581,351 | 4/1986 | Berke et al. | 514/345 |
| 4,918,147 | 4/1990 | Yamamori et al. | 424/78 |

*Primary Examiner*—William R. Dixon, Jr.
*Assistant Examiner*—Anthony J. Green
*Attorney, Agent, or Firm*—Dale Lynn Carlson

[57] ABSTRACT

This invention relates to an improved paint or paint base composition characterized by enhanced biocidal efficacy. The paint or paint base composition is essentially free of tin, lead, and vanadium and contains a biocide comprising pyrithione salt and a copper salt. The pyrithione salt is present in the paint in an amount of between about 5% and about 50%, and the copper salt is present in an amount of between about 5% and about 50%, the total amount of biocide being between about 10% and about 75%, based upon the total weight of the paint composition.

10 Claims, No Drawings

PAINT CONTAINING HIGH LEVELS OF A PYRITHIONE SALT PLUS A COPPER SALT

This application is a Continuation-in-part of U.S. application Ser. No. 07/518,602 filed May 3, 1990, now abandoned.

BACKGROUND OF THE INVENTION

Paints containing pyrithione are known in the art. For example, U.S. Pat. No. 4,039,312 discloses a marine paint containing an N-hydroxypyridinethione compound and a haloborate or halosilicate which is said to provide synergistic biocidal efficacy. However, the paint of the '312 patent has not been commercially adopted to the knowledge of the present inventors, possibly attributable to the relatively low amount of total biocide disclosed in this patent of from 0.3 to 15%, preferably from 0.8% to 3.6% based upon the weight of the paint composition.

Most commercial marine paints contain metals such as tin as biocidal additives. Recently, legislation has been enacted which severely limits the use of certain metals, for example lead and tin, in paints and so-called "paint bases" (i.e., the partially-formulated paint before pigment addition) due to toxicity considerations. Other heavy metals, such as vanadium have been disclosed for use in paints and paint bases, as illustrated by the vanadium-containing composition disclosed in Example 27 of U.S. Pat. No. 4,918,147, are also subject to toxicity considerations. Since these metals typically provide antimicrobial efficacy, replacement antimicrobial additives for paints are needed by the paint industry. In addition, improved paint compositions exhibiting enhanced antimicrobial effectiveness would be highly desired by the paint manufacturing community. Further, improved marine paints that exhibit enhanced efficacy against barnacle growth and other marine organisms are much sought after by marine paint manufacturers and users.

SUMMARY OF THE INVENTION

In one aspect, the present invention relates to a paint or paint base composition which is essentially free of tin, lead, and vanadium and is characterized by enhanced biocidal efficacy wherein the paint or paint base composition comprises a pyrithione salt and a copper salt, said pyrithione salt being present in an amount of between about 5% and about 50%, and said copper salt being present in an amount of between about 5% and about 50%, the total amount of said pyrithione salt plus said copper salt being between about 10% and about 75%, based upon the total weight of the paint or paint base composition.

In another aspect, the present invention relates to an improved process for providing biocidal efficacy to a paint or paint base which is essentially free of tin, lead, and vanadium, the improvement which comprises adding to said paint or paint base a pyrithione salt and a copper salt, said pyrithione salt being added in an amount of between about 5% and about 50%, and said copper salt being present in an amount of between about 5% and about 50%, the total amount of said pyrithione salt plus said copper salt being between about 10% and about 75% (preferably between about 20% and about 75%) based upon the total weight of the paint composition.

These and other aspects of the invention will become apparent upon reading the following detailed description of the invention.

DETAILED DESCRIPTION OF THE INVENTION

Although the improved biocidal efficacy advantages associated with the present invention provides advantages to a wide variety of paints, including indoor and outdoor household paints, industrial and commercial paints, particularly advantageous results are obtained when the process and composition of the present invention are utilized in conjunction with marine paints for use, for example, on ship's hulls. In addition, the composition and process of the present invention provides highly desirable results in the context of exterior paints of both the latex and alkyd types.

Typically, a paint composition will contain a resin, a pigment, and various optional additives such as thickening agent(s), wetting agents, and the like, as is well-known in the art. The resin is preferably selected from the group consisting of vinyl, alkyl, epoxy, acrylic, polyurethane and polyester resins, and combinations thereof.

In addition, the paint composition of the present invention optionally additionally contains optional additives which have a favorable influence on the viscosity, the wetting power and the dispersibility, as well as on the stability to freezing and electrolytes and on the foaming properties. If a marine paint is being fabricated, the paint preferably contains a swelling agent to cause the paint to gradually "slough off" in its marine environment, thereby causing renewed biocidal efficacy of newly exposed biocide (i.e., the pyrithione salt plus the copper salt) at the surface of the paint in contact with the water medium of the marine environment. Preferred swelling agents are naturally-occurring or synthetic clays, such as kaolin, montomorillonite (bentonite), clay mica (muscovite), and chlorite (hectonite), and the like. In addition to clays, other swelling agents, including natural or synthetic polymers, such as that commercially available as POLYMERGEL, have been found to be useful in the compositions of the present invention to provide the desired "sloughing off" effect. swelling agents can be used singly or in combination. The preferred swelling agent is bentonite. The total amount of optional additives is preferably no greater than 20% by weight, more preferably between about 1% and about 5% by weight, based upon the total weight of the paint composition.

Illustrative thickening agents include cellulose derivatives, for example methyl, hydroxyethyl, hydroxypropyl and carboxymethyl cellulose, poly(vinyl alcohol), poly (vinylpyrrolidone), poly(ethylene-glycol), salts of poly(acrylic acid) and salts of acrylic acid/acrylamide copolymers.

Suitable wetting and dispersing agents include sodium polyphosphate, salts of low-molecular-weight poly(acrylic acid), salts of poly(ethane-sulfonic acid), salts of poly (vinyl-phosphonic acid), salts of poly(-maleic acid) and salts of copolymers of maleic acid with ethylene, 1-olefins with 3 to 18 carbon atoms and/or styrene.

In order to increase the stability to freezing and electrolytes there may be added to the paint composition various monomer 1,2-diols, for example glycol, propylene-glycol-(1,2), and butylene-glycol-(1,2) or polymers thereof, or oxethylated compounds, for example reaction products of ethylene oxide with long-chain alkanols, amines, carboxylic acids, carboxylic acid amides, alkyl phenols, poly(propylene-glycol) or poly(butylene-glycol).

The minimum temperature of film formation (white point) of the paint composition may be reduced by adding solvents, such as ethylene-glycol, butyl-glycol, ethyl-glycol acetate, ethyl-diglycol acetate, butyl-diglycol acetate, benzine or alkylated aromatic hydrocarbons. As defoaming agents there are suitable for example poly(propylene-glycol) and polysiloxanes.

The paint composition of the present invention may be used as a paint for natural or synthetic materials, for example wood, paper, metals, textiles and plastics. It is particularly suitable as an outdoor paint, and is excellent for use as a marine paint.

The invention is further illustrated by the following Examples. Unless otherwise stated, the "parts" and "%" are "parts by weight" and "percent by weight", respectively.

While the invention has been described above with references to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

weight of methylisobutylketone, and one part by weight of carbitol. To the resulting mixture was added a titinium dioxide pigment, a talc filler (TALC 57, a micotalc-montana talc product of Pfizer Corporation, and a leveling agent (BYK 307, a silicone product of BIC Chmie), together with zinc pyrithione (zinc OMADINE, a product of Olin Corporation), and a cuprous salt. The cuprous salt utilized to make each formulation was either cuprous oxide or cuprous thiocyanate, as identified in Table 1 below. The amount of each formulation component is also given in Table 1.

The resulting mixture was mixed for three hours until it was totally homogeneous, and then 62 grams of vinyl chloride-vinyl acetate-vinyl alcohol terpolymer (vinyl VAGH, a product of Union Carbide Corporation) was added and the resulting mixture was ball milled for 72 hours to form a paint composition.

The paint composition was brushed onto fiberglass panels to form a paint film having a thickness of 5 to 8 mils. The paint film dried in about one and a half hours.

The paint film on the fiberglass panels were tested under marine conditions in accordance with the following testing regimen.

B. Testing Regimen

A series of test samples, prepared in accordance with the procedure given above, were tested in the ocean at an off shore Miami Florida marine research facility. Panels are mounted on a raft according to ASTM D3623 for Immersion Testing in order to simulate the

TABLE 1

| SAMPLE # | PANEL TESTS AT MARINE FACILITY | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Formulation Components (in grams) | | | | | | | | | | | | | |
| TOTAL BIOCIDE LOADING | 0 | 42.89 | 47.59 | 72.05 | 22.19 | 32.26 | 0 | 29.05 | 44.64 | 42.89 | 55.15 | 38.44 | 38.44 |
| ZINC OMADINE (R) | 0 | 170.25 | 85 | 170.25 | 85 | 0 | 85 | 170.25 | 0 | 170.25 | 85 | 85 | 85 |
| COPPER (I) OXIDE | 0 | 454 | 0 | 908 | 0 | 454 | 0 | 0 | 0 | 0 | 908 | 454 | 454 |
| COPPER (I) THIOCYANATE | 0 | 0 | 454 | 0 | 0 | 0 | 0 | 0 | 454 | 0 | 0 | 0 | 0 |
| TIO2 | 50 | 50 | 50 | 50 | 200 | 200 | 50 | 200 | 200 | 50 | 50 | 200 | 200 |
| TALC 57 | 0 | 0 | 0 | 0 | 100 | 100 | 0 | 100 | 0 | 0 | 0 | 0 | 0 |
| BENTONITE | 370 | 370 | 370 | 0 | 0 | 0 | 370 | 185 | 185 | 370 | 185 | 185 | 185 |
| BENTON 27 | 0 | 0 | 0 | 6 | 6 | 6 | 0 | 0 | 0 | 0 | 0 . | 0 |
| ROSIN WW | 42 | 42 | 42 | 42 | 42 | 42 | 42 | 42 | 42 | 42 | 42 | 42 | 42 |
| VINYL (VAGH) | 62 | 62 | 62 | 62 | 62 | 62 | 62 | 62 | 62 | 62 | 62 | 62 | 62 |
| XYLENE | 125 | 125 | 125 | 125 | 125 | 125 | 125 | 125 | 125 | 125 | 125 | 125 | 125 |
| MIBK | 250 | 250 | 250 | 250 | 250 | 250 | 250 | 250 | 250 | 250 | 250 | 250 | 250 |
| CARBITOL ACETATE | 125 | 125 | 125 | 125 | 125 | 125 | 125 | 125 | 125 | 125 | 125 | 125 | 125 |
| PERCENT DRY LOADING W(g) @ (g/cm3) = V % | 63.2 | 78.98 | 80.71 | 75.5 | 60.97 | 65.47 | 69.57 | 74.49 | 76.5 | 78.98 | 76.76 | 73.86 | 73.86 |
| WATERLINE TESTING | | | | | | | | | | | | | |
| BARNACLES (AREA %) | 55 | 1 | 4 | 0 | 60 | 3 | 50 | 50 | 1 | 00 | 0 | 0 | 0 |
| TOTAL FOULING (AREA %) | 80 | 1 | 4 | 0 | 63 | 75 | 53 | 57 | 62 | 1 | 1 | 1 | 1 |
| WEAR (% AREA) | 2 | 27 | 7 | 3 | 0 | 5 | 5 | 3 | 5 | 20 | 1 | 1 | 1 |
| TOTAL IMMERSION TESTING (ASTM D3623) | | | | | | | | | | | | | |
| BARNACLES (AREA %) | 50 | 2 | 6 | 0 | 30 | 1 | 35 | 35 | 7 | 1 | 0 · 0 | 0 |
| TOTAL FOULING (AREA %) | 85 | 1 | 9 | 0 | 58 | 10 | 39 | 45 | 29 | 1 | 0 | 0 | 0 |
| WEAR (% AREA) | 1 | 26 | 6 | 4 | 4 | 8 | 22 | 6 | 1 | 31 | 1 | 4 | 3 |

EXAMPLE 1

Determination Of The Biocidal Efficacy Of Paints Containing A Pyrithione Salt Plus A Copper Salt

A. Procedure For Preparing Samples For Testing

Paints were prepared in accordance with the following procedure: A ball mixer was used to disperse 42 grams of ROSIN WW, a natural wood rosin product of Hercules Inc., into 330 grams of a solvent. The solvent consisted of one part by weight of xylene, two parts by hull of a ship at anchor. A second test was also performed in order to gather data on the effects of grass and barnacle growth caused by water splashing on a ship at anchor. This waterline test has been previously found to produce large amounts of marine organism growth on control panels. Test and control panels are checked and photographed every two weeks for the period of five months in order to document fouling. The test results are given in Table 1. As a comparison, test panels were prepared and tested in an analogous manner using commercial marine paints. One commercial paint contained a biocide package of tributyltin methacyanate polymer and copper thiocyanate (commercially available as INTERLUX), and another commercial paint contained high loadings of copper oxide as the biocide therein.

The results as given in Table 1 indicate that improved biocidal efficacy against a broad spectrum of marine organisms, including both barnacles and microorganisms, is provided using the biocide composition of the present invention. More specifically, the results indicate that the combination of a pyrithione salt with a cuprous salt minimizes the amount of barnacle growth and microorganism and barnacle growth on the paint surface of the fiberglass panel. This biocidal efficacy is particularly significant since it was achieved without the use of conventional, more toxic barnacle-biocides such as organo-tin compounds. Indeed, in a comparison against an organo-tin containing INTERLUX formulation which provided a total fouling of 10% (for blue paint) and 60% (for black paint) of the surface of the panel in the waterline immersion test, the biocide composition of the present invention provided generally improved biocidal activity, as is made clear by the data provided in Table 1 below.

What is claimed is:

1. A paint or paint base composition which is essentially free of tin, lead, and vanadium and is characterized by enhanced biocidal efficacy wherein the paint or paint base composition comprises a pyrithione salt and a copper salt, said pyrithione salt being present in an amount of between about 5% and about 50%, and said copper salt being present in an amount of between about 5% and about 50%, the total amount of said pyrithione salt plus said copper salt being between about 10% and about 75%, based upon the total weight of the paint or paint base composition.

2. The paint or paint base of claim 1 wherein the total amount of said pyrithione salt plus said copper salt is between about 20% and about 75% based upon the total weight of the paint or paint base composition.

3. The paint or paint base of claim 1 which additionally contains from about 1% to about 5% of a swelling agent selected from the group consisting of natural and synthetic clay and natural and synthetic polymer swelling agents.

4. The paint or paint base of claim 3 wherein said swelling agent is selected from the group consisting of kaolin, montomorillonite (bentonite), clay mica (muscovite), and chlorite (hectonite), and combinations thereof.

5. The paint or paint base composition of claim 1 wherein said copper salt is selected from the group consisting of cuprous oxide and cuprous thiocyanate.

6. An improved process for providing biocidal efficacy to a paint or paint base which is essentially free of tin, lead, and vanadium, the improvement which comprises adding to said paint or paint base a pyrithione salt and a copper salt, said pyrithione salt being added in an amount of between about 5% and about 50%, and said copper salt being present in an amount of between about 5% and about 50%, the total amount of said pyrithione salt plus said copper salt being between about 10% and about 75% based upon the total weight of the paint or paint base.

7. The process of claim 6 wherein the total amount of said pyrithione salt plus said copper salt is between about 20% and about 75% based upon the total weight of the paint or paint base composition.

8. The process of claim 6 wherein said composition additionally contains from about 1% to about 5% of a swelling agent selected from the group consisting of natural and synthetic clay and natural and synthetic polymer swelling agents.

9. The process of claim 8 wherein said swelling agent is selected from the group consisting of kaolin, montomorillonite (bentonite), clay mica (muscovite), and chlorite (hectonite), and combinations thereof.

10. The process of claim 6 wherein said copper salt is selected from the group consisting of cuprous oxide and cuprous thiocyanate.

* * * * *